United States Patent [19]

Kartsounes et al.

[11] 4,158,145

[45] Jun. 12, 1979

[54] COMBINED COMPRESSED AIR STORAGE-LOW BTU COAL GASIFICATION POWER PLANT

[75] Inventors: George T. Kartsounes; Norman F. Sather, both of Naperville, Ill.

[73] Assignee: The United States of America as represented by the United States Department of Energy, Washington, D.C.

[21] Appl. No.: 844,084

[22] Filed: Oct. 20, 1977

[51] Int. Cl.$^2$ .............................................. F02C 3/00
[52] U.S. Cl. ........................................ 290/52; 60/652; 60/676
[58] Field of Search .................... 290/52; 60/676, 652, 60/39.01, 39.02, 39.12

[56] References Cited

U.S. PATENT DOCUMENTS

| | | | |
|---|---|---|---|
| 1,846,389 | 2/1932 | Gay | 60/39.18 B |
| 3,831,373 | 8/1974 | Flynt | 290/52 |

Primary Examiner—Gene Z. Rubinson
Assistant Examiner—Morris Ginsburg
Attorney, Agent, or Firm—Dean E. Carlson; Frank H. Jackson

[57] ABSTRACT

An electrical generating power plant includes a Compressed Air Energy Storage System (CAES) fueled with low BTU coal gas generated in a continuously operating high pressure coal gasifier system. This system is used in coordination with a continuously operating main power generating plant to store excess power generated during off-peak hours from the power generating plant, and to return the stored energy as peak power to the power generating plant when needed. The excess coal gas which is produced by the coal gasifier during off-peak hours is stored in a coal gas reservoir. During peak hours the stored coal gas is combined with the output of the coal gasifier to fuel the gas turbines and ultimately supply electrical power to the base power plant.

9 Claims, 3 Drawing Figures

COMBINED COMPRESSED AIR STORAGE-LOW BTU COAL GASIFICATION POWER PLANT

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to an electrical generating power plant including a Compressed Air Energy Storate (CAES) system. More particularly this invention relates to a CAES system which stores excess power from an electrical power generating plant during off-peak hours, and returns the stored energy as peak power when required. More particularly, this invention relates to a CAES system which is fueled with low BTU coal gas generated in a continuously operating pressurized air coal gasifier, the coal gas being stored in a coal gas reservoir during off-peak hours.

The electric utility industry has as its main objective the supply of power at the lowest possible cost. This purpose has led to the development of large sophisticated nuclear and fossil-fuel-fired steam generating plants. For both technical and economical reasons, these plants should be operated at a steady load. However, to meet daily and seasonal fluctuations in power demand, the industry uses so called peaker units. The most common form of these units are gas turbine systems that use premium fuels such as natural gas and oil.

Because of the limited supply of oil and natural gas in this country and current problems in the supply of petroleum fuel from foreign sources, premium fuel has become very expensive and the long-term supply is uncertain. Therefore, electric utilities have been exploring better ways of utilizing, or even eliminating, the use of premium fuels for peaker units and the possibility of operating their large power plants at steady or constant load. These considerations have led to the investigation of energy storage systems.

Studies conducted by electric utilities indicate that CAES power plants are attractive for consideration as an energy storage system. A CAES plant may comprise a gas turbine-generator set, a combustor to preheat the air, a compressor system, and an underground air storage reservoir. In contrast to conventional peaker units, the turbine system and compressor system are uncoupled; each system operates independently.

The purpose of this arrangement is twofold. Firstly, the compressor system is driven with cheap off-peak power from the main power generating plant and the energy is stored as compressed gas in a compressed gas reservoir. Secondly, during peak hours the compressed air stored in the reservoir is utilized to run the turbines at their full power. This is in contrast to a conventional gas turbine peaker unit wherein the total power output is reduced by one or two thirds. The reason for this reduction in power is because that portion of the system's power is used internally to operate compressors which are needed to supply compressed air to the turbine. By utilizing a CAES system fuel savings on the order of 50% to 60% are possible. However, the CAES systems still have the problem of not completely eliminating the need for premium fuel.

It is an object of the present invention to provide an improved CAES power plant which substantially eliminates the need for premium fuel. This invention utilizes a unique combination of a CAES system, a high pressure continuously operating coal gasifier, and a coal gas storage reservoir.

SUMMARY OF THE INVENTION

An electrical generating power plant is disclosed including a Compressed Air Energy Storage (CAES) system fueled with low BTU coal gas generated in a continuously operating high pressure coal gasifier. This system is used in coordination with a continuously operating main power generating plant to store excess power generated during off-peak hours from the main power generating plant, and to return the stored energy as peak power to the main power generating plant when needed. The excess coal gas which is produced by the coal gasifier during off-peak hours is stored in a coal gas reservoir. During peak hours the stored coal gas is combined with the output of the coal gasifier to fuel the gas turbines and ultimately supply electrical power to the main power generating plant. This electric power could also be fed directly to the electric grid.

There are 3 modes of operation for the invention, the charging mode, the power generating mode, and the idle mode. During the charging mode power from a main power generating plant is used to run a motor/generator as a motor. The motor is connected to a compressor. Compressed air from the air compressor is stored in an air storage reservoir. Some of the compressed air from the air storage reservoir is delivered into a continuously operating coal gasifier system. Coal gas from the coal gasifier is stored in a coal gas storage reservoir.

During the power generating mode the motor/generator is disconnected from the compressor and connected to a gas turbine. The motor/generator operates as a generator and delivers power to the main power generating plant. Compressed air from the storage reservoir is delivered into a combustor and the coal gasifier. Coal gas from the coal gasifier and the coal gas storage reservoir is delivered into the combustor. The combustor combines the compressed air from the air storage reservoir and the coal gas to provide high pressure gas which is used to power the gas turbine.

During the idle mode the motor/generator is disconnected from both the compressor and the gas turbine. Compressed air from the air storage reservoir is delivered into the coal gasifier. Coal gas from the coal gasifier is stored in the coal gas storage reservoir.

BRIEF DESCRIPTION OF THE DRAWINGS

The present invention is illustrated in the accompanying drawings wherein.

DETAILED DESCRIPTION OF THE INVENTION

Figure 1:
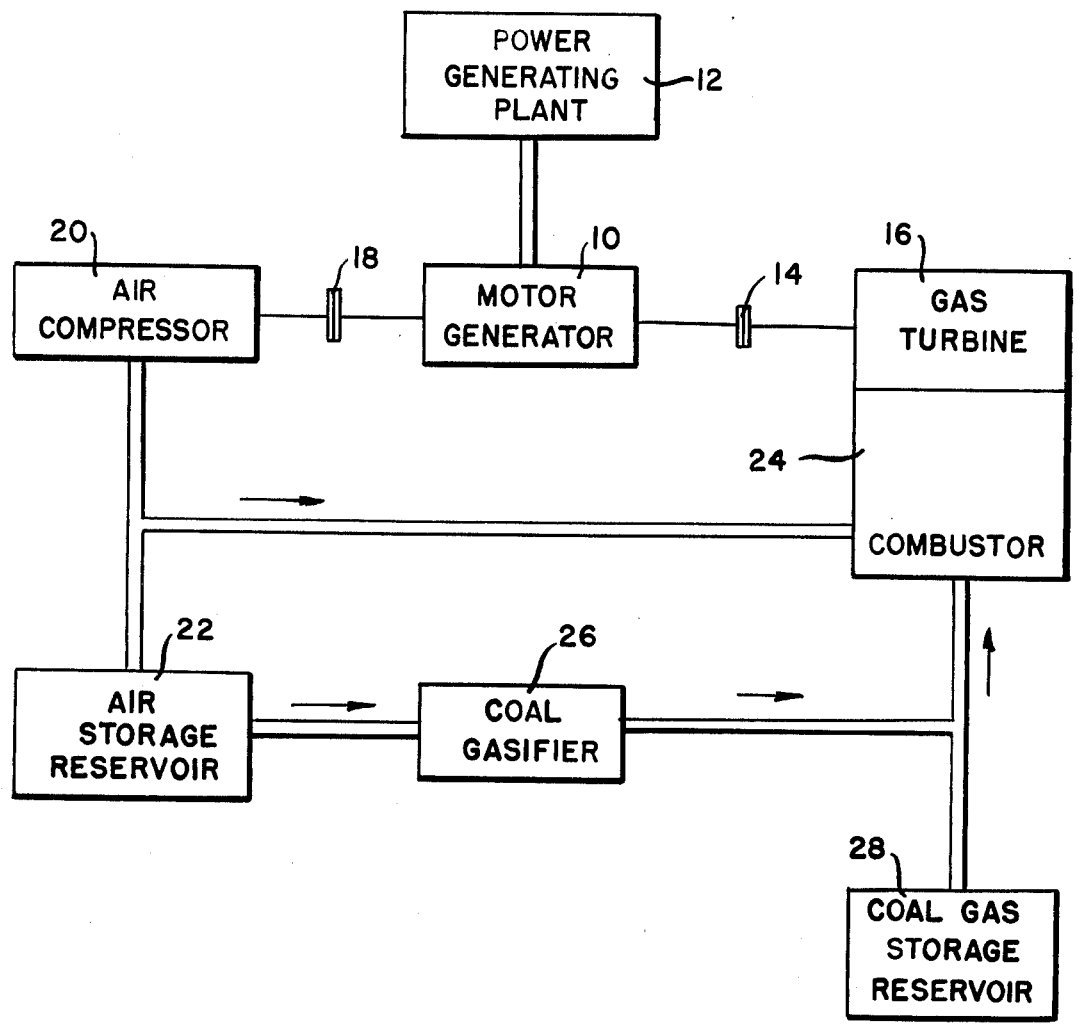
FIG. 1 is block diagram illustrating the bare essentials of a system according to this invention.

Referring first to FIG. 1 a motor/generator 10 is connected to a power generating plant 12. The motor/generator 10 is also connected through a disconnectable coupling 14 to a gas turbine 16 and through another disconnectable coupling 18 to an air compressor 20. The output of the air compressor 20 is connected to an air storage reservoir 22 and a combustion means 24. The air storage reservoir 22 is connected to a coal gasifier 26 and the combustion means 24. The output of the coal gasifier 26 is connected to a coal gas storage reservoir 28 and the combustion means 24. The coal gas storage reservoir 28 is also connected to the combustion means 24. The combustion means 24 is connected to the gas turbine 16.

There are 3 modes of operation for the invention, the charging mode, the power generating mode, and the idle mode. During the charging mode, the coupling 14 of the turbine system 16 is disconnected and the coupling 18 to the air compressor system 20 is connected. The motor/generator 10 operates as a motor and receives power from the power generating plant 12. Compressed air from the air compressor 20 is stored in the air storage reservoir 22. Some of the compressed air from the air storage reservoir 22 is diverted into the coal gasifier system 26. Coal gas from the coal gasifier 26 is stored in the coal gas storage reservoir 28.

During the power generating mode, the coupling 14 of the gas turbine 16 is connected and the coupling 18 to the air compressor system 20 is disconnected. The motor/generator 10 operates as a generator and delivers power to the power generating plant 12. Compressed air from the air storage reservoir 22 is diverted into the combustor 24 and the coal gasifier 26. Coal gas from the coal gasifier 26 and the coal gas storage reservoir 28 is diverted to the combustor 24. The combustor 24 combines the air from the air storage reservoir 22 and the coal gas from the coal gasifier 26 and the coal gas storage reservoir 28 to provide high pressure gas which is used to power the gas turbine 16.

During the idle mode both couplings 14 and 18 are disconnected. Compressed air from the air storage reservoir 22 is diverted into the coal gasifier 26. Coal gases from the coal gasifier 26 are stored in the coal gas storage reservoir 28.

In the idle mode the CAES system does not function. Depending upon the load profile of the utility that this invention is connected to, this mode may or may not exist.

It will be appreciated that the air compressor 20 and the gas turbine 16 would each in practice have a number of stages designed according to well established engineering practice.

Figure 2:
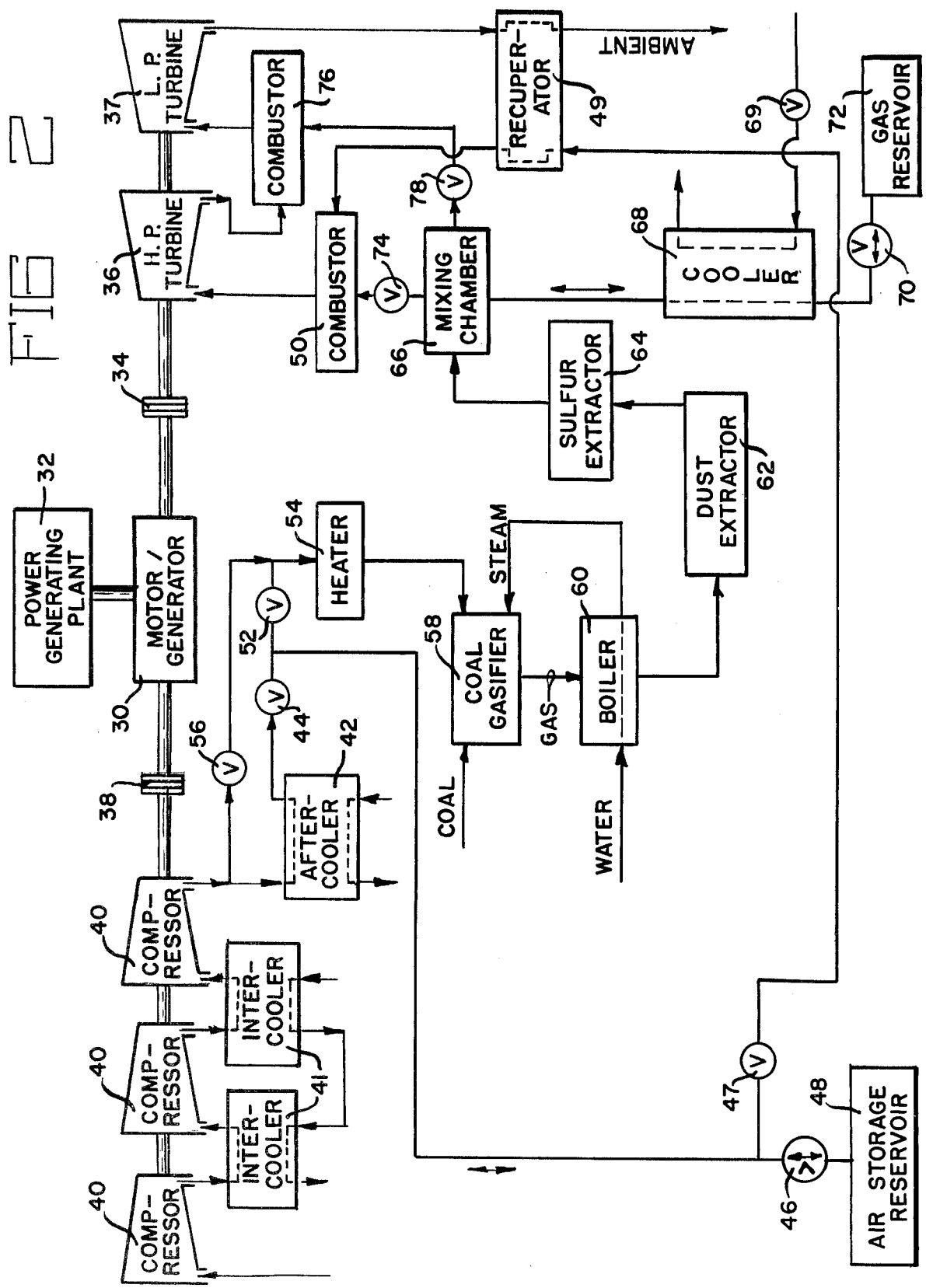
FIG. 2 is a schematic diagram illustrating a possible combination of a CAES system with a coal gasification system according to this invention.

FIG. 2 shows a more detailed embodiment of the invention. A motor/generator 30 is connected to a power generating plant 32. The motor/generator 30 is also connected through a disconnectable coupling 34 to a high pressure turbine 36 and a low pressure turbine 37 and through another disconnectable coupling 38 to a compressor 40. The stages of the compressor 40 are connected by intercoolers 41. The compressor 40 is connected to an aftercooler 42. The aftercooler 42 is connected through valve 44 and valve 46 to the air reservoir 48. The aftercooler 42 is also connected through valve 44 and valve 47 to a recuperator 49. The recuperator 49 is connected to a combustor 50. The aftercooler 42 is also connected through valve 44 and valve 52 to a heater 54. The compressor 40 is also connected through valve 56 to the heater 54. The heater 54 is connected to a coal gasifier 58. The coal gasifier 58 is connected to a boiler 60 which is connected to a dust extractor 62 which is connected to a sulfur extractor 64 and finally which is connected to a mixing chamber 66.

The mixing chamber 66 is connected to a cooler 68 which is connected through the valve 70 to the gas reservoir 72. The cooler is connected to valve 69. The mixing chamber 66 is also connected through valve 74 to the combustor 50. The combustor 50 is connected to the high pressure turbine 36. The high pressure turbine 36 is connected to a low pressure turbine 37 and also to a combustor 76. The mixing chamber 66 is also connected through valve 78 to combustor 76 and combustor 76 is connected to the low pressure turbine 37. The low pressure turbine 37 is connected to the recuperator 49.

The invention as pictured in FIG. 2 and described above works as follows. During the charging mode, the coupling 34 to the turbine system which consists of a high pressure turbine 36 and a low pressure turbine 37 is disconnected and the coupling 38 to the compressor system 40 is connected. The motor/generator 30 operates as a motor and receives power from the power generating plant 32. Valves 52, 47, 74 and 78 are closed. The heater 54 is off.

Part of the flow leaving the last compressor 40 is diverted past the aftercooler 42 and enters the gasifier 58 at an elevated temperature (e.g., 600° F.) since the heat of compression has not been removed. The majority of the air flows through the aftercooler 42 and into the air reservoir 48. The aftercooler 42 is necessary to cool the air to the ambient reservoir temperature (e.g., 120° F.) to protect the air reservoir 48 from thermal stress damage.

Coal, steam, and hot air flow into the coal gasifier 58 and high temperature coal gas flows out. The coal gas then flows through a boiler 60 where some of its heat is removed to raise steam. From the boiler 60, the gas flows through a dust extractor 62 where coal dust and clinkers are removed. This is followed by a sulfur extractor 64 which removes sulfur in the form of $H_2S$ vapor.

The coal gas then flows through the mixing chamber 66, through the cooler 68, and into the gas reservoir 72. The cooler 68 is necessary to cool the coal gas to the ambient reservoir temperature (e.g., 120° F.).

During the power generating mode, the coupling 38 to the compressor 40 is disconnected and the coupling 34 to the turbine system which consists of a high pressure turbine 36 and a low pressure turbine 37 is connected. The motor/generator 30 now operates as a generator. Valves 56, 44 and 69 are closed and the heater 54 is turned on.

Air is removed from the air reservoir 48 to feed combustor 50 and the coal gasifier 58. Part of the air flows through valve 52 and the heater 54, and into the coal gasifier 58. The heater 54 is used to preheat the air entering the coal gasifier 58 to the same temperature as in the charging mode. The majority of the air flows through valve 46 and valve 47, through the recuperator 49, and into combustor 50. The recuperator 49 preheats the air using the high temperature exhaust (e.g., 700° F.) from the low pressure turbine 37.

The coal gas leaving the coal gasifier 58 flows through the boiler 60, dust extractor 62, and sulfur extractor 64, and into the mixing chamber 66 where it is mixed with coal gas from the gas reservoir 72. The temperature of the gas leaving the mixing chamber is between the temperatures of the two entering streams.

In combustor 50, the coal gas and air are combusted to form a high temperature gas (e.g., 1000° F.). The products of combustion are expanded through the high pressure turbine 36 and the power developed turns the generator 30 rotor. The turbine exhaust, and the coal gas which is flowing through valve 78 are combined in combustor 76 to form a high temperature gas (e.g., 1800° F.). The products are expanded through the low pressure turbine 37 and the power developed turns the generator 30 rotor. The low pressure turbine 37 exhaust gas flows through the recuperator 49 and gives off heat to the air. It is then exhausted to the ambient.

In the idle mode, both couplings 34 and 38 are disconnected and the heater 54 is turned on. Valves 56, 44, 47, 74, and 78 are closed. Air from the air reservoir 48 flows through valves 46 and 52 and the heater 54, and into the coal gasifier 58. The coal gas flows through the boiler 60, dust extractor 62, sulfur extractor 64, mixing chamber 66, and cooler 68, and into the gas reservoir 72.

Figure 3:
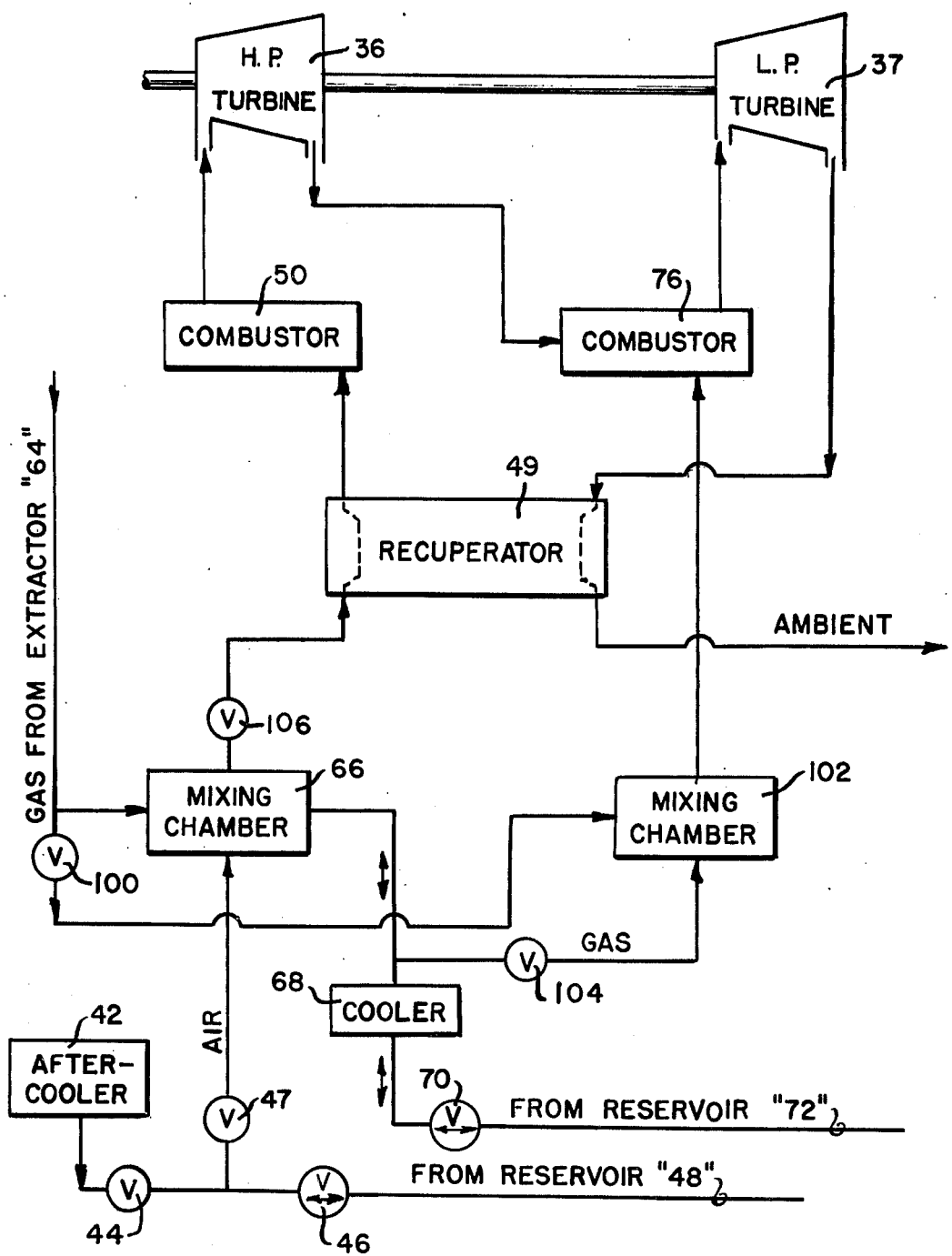
FIG. 3 is a schematic diagram illustrating another possible combination of a CAES system with a coal gasification system according to this invention.

FIG. 3 shows another detailed embodiment of the invention. The elements of FIG. 3 which are identical to the elements of FIG. 2 have been given the same numbers. Only the new elements will be discussed. The aftercooler 42 is connected through valve 44 and valve 47 to a mixing chamber 66. The sulfur extractor 64 is connected to mixing chamber 66 and through valve 100 to a mixing chamber 102. The mixing chamber 102 is connected to a cooler 68, which is connected through valve 70 to a gas reservoir 72. Although not shown in FIG. 3, cooling means are connected to cooler 68 in a fashion similar to the cooling means which are connected to cooler 68 in FIG. 2. Mixing chamber 66 is also connected through valve 104 to mixing chamber 102. Mixing chamber 102 is connected to a combustor 76. Mixing chamber 66 is also connected through valve 106 to a recuperator 49, which is connected to a combustor 50, which is connected to the high pressure turbine 36. The high pressure turbine 36 is connected to a low pressure turbine 37 and the combustor 76. The combustor 76 is connected to the low pressure turbine 37 which is connected to the recuperator 49.

The system in FIG. 3 differs from the system in FIG. 2 in that two mixing chambers, mixing chamber 66 and mixing chamber 102, are used and a coal gas-air mixture flows through the recuperator 49. These changes were made because the increased mass flow rate of the gas-air mixture will result in increased heat transfer in the recuperator 49.

The invention as pictured in FIG. 3 and described above works as follows. During the charging mode valves 52, 47, 100, 106, and 104 are closed, and the heater 54 is off. During the power generating mode valves 56, 44, and 69 are closed and the heater 54 is on. During the idle mode valves 56, 44, 47, 100, 106, and 104 are closed and the heater 54 is on. The flow through the system follows the discussion of the system illustrated in FIG. 2.

During the power generating mode, mixing chamber 66 receives air from the air reservoir 48 and gas from both gasifier 58 and gas reservoir 72. Mixing chamber 102 receives gas from both the gas reservoir 72 and the coal gasifier 58.

There are several things that should be noted about the invention. A coal gasifier is used because it eliminates the need for premium fuel, and instead runs on cheaper and more abundant coal. Further a coal gasifier is used which produces a high pressure rather than a low pressure stream of combustible gases. This is done because at a high pressure a greater quantity of coal gas can be stored in a given volume of the coal gas reservoir. It is also done because a more efficient utilization of energy is realized in the combustor.

For economic reasons this invention utilizes a coal gasifier which uses a pressurized air supply vs. an air supply at atmospheric pressure. The reason for this is because the cost of atmospheric generation is too expensive since the loading of a gasifier can be increased at least as the square root of the pressure. However, there is a major problem with using a conventional coal gasifier with a pressurized air supply. The system requires a turbine-compressor set to supply the pressurized air. This turbine-compressor uses a large portion of the coal gas energy output to operate, thus reducing the total amount of coal gas which is available for electrical power generation. To overcome this problem, this invention eliminates the turbine compressor and instead utilizes the pressurized air leaving the CAES compressors during the charging mode or the pressurized air stored in the reservoir as an air supply to the gasifier.

A further problem with using a coal gasifier is that the CAES plant only need coal gas as a fuel during the power generating mode. However, the thermal efficiency and life expectancy of a gasifier is greatest when it operates continuously without frequent starting and stopping. To overcome this problem this invention utilizes a coal gasifier which is operated continuously. The excess coal gas which is produced during non-peak hours is stored in a coal gas reservoir. During peak-hours the coal gas output of the coal gasifier is combined with the coal gas stored in the coal gas reservoir to provide fuel for the combustor. This allows a reduction in the total size of the coal gasifier or conversely an increase in the size of the gas turbines.

There are several possible variations to the systems as outlined above. The heater 52 is necessary during the power generating mode and the idle mode to maintain a fixed air temperature to the coal gasifier 58. It could be either an electric resistance heater or a heat exchanger. As a heat exchanger, the high temperature coal gas leaving the coal gasifier 58 could be used to preheat the air. In the idle mode, part of the heat removed in the cooler 68 could be used to preheat the air.

Another possibility is to operate the heater 54 in all three modes. During the charging mode and the idle mode part of the heat removed in the cooler 68 could be used to preheat the air. The amount of heat needed in each mode will differ since the heat of compression will be present in the air during the charging mode. During the power generating mode, the coal gas leaving the coal gasifier 58 could be used as a heat source. Using the heater 54 in all three modes will result in a higher inlet air temperature to the coal gasifier 58.

The boiler 60 could consist of a water jacket surrounding the coal gasifier 58 unit. This would have the advantage of maintaining low metal temperatures and increasing system reliability and life.

In the system outlined in FIG. 3, the valve 100 and its associated piping to mixing chamber 102 could be eliminated. This has the advantage of increasing the flow rate of gas plus air through the recuperator 49 and the disadvantage of lowering the gas temperature into combustor 76.

The compressed air and coal gas can be stored underground in caverns or in the pore space of porous rock formations. The caverns may be natural or mined. The latter may be constructed by conventional mining, nuclear explosives, or solution mining as in the case of salt structures. Because the porous rock formations generally contain water, they are called aquifers. To use an aquifer, as a storage reservoir, as has been done for many years, the water in the rock must be displaced by air.

Another possible configuration for the air reservoir 48 and gas reservoir 72 is to use a water compensated reservoir. These reservoirs are connected to an above ground body of water by a water shaft. The advantage of this is to keep a self-controlled constant pressure on the gas or air as it exits the reservoir.

If future research indicates that it is possible to store hot air or hot coal gas directly in a reservoir, then the aftercooler 42 and cooler 68 could be eliminated. These components could also be eliminated if a suitable regenerative heat storage system is developed.

The embodiments of the invention in which an exclusive property or privilege is claimed are defined as follows:

1. In combination with a base power generating plant 32, a compressed air energy storage/coal gasification system comprising:
    a motor/generator 30 coupled to the power generating plant 32 for operation as a motor in slack demand periods and as a generator in peak demand periods,
    an air compressor 40 disconnectably coupled to the motor/generator 30 for operation by the motor/generator in slack demand periods.
    a high pressure gas turbine 36 disconnectably coupled to the motor/generator 30 to operate the motor/generator 30 in peak demand periods,
    an air storage reservoir 48 connected to the outlet of the air compressor 40,
    a coal gasifier 58 connected to the outlet of the air compressor 40 and to the air storage reservoir 48,
    a coal gas storage reservoir 72 connected to the outlet of the coal gasifier 58, and
    a combustor 50 connected to the outlets of the coal gasifier 58 and the air compressor 40 and to the coal gas storage reservoir 72 and air storage reservoir 48, said combustor producing a high pressure gas stream for use in gas turbine 36.

2. The system of claim 1 which further comprises a heater 54 for preheating the compressed air utilized in the coal gasifier 58.

3. The system of claim 2 which further comprises a low pressure turbine 37, said turbine being serviced by a combustor 76.

4. The system of claim 3 which further comprises a recuperator 49 for preheating the compressed air intake into the combustor 50 for the high pressure turbine 36 by heat exchange with the exhaust gas from the low pressure turbine 37.

5. The system of claim 4 which further comprises a mixing chamber 66 for mixing the output of the coal gasifier 58 and the coal gas reservoir 72.

6. The system of claim 5 which further comprises an aftercooler 42 for cooling the output of the compressor 40.

7. The system of claim 6 which further comprises a cooler 68 for cooling the coal gas produced in coal gasifier 58 prior to storing it in coal gas storage reservoir 72.

8. The system of claim 7 which further comprises dust and sulfur extractors (62 and 64 respectively) for treating the output of the coal gasifier 58.

9. A method of operating an electrical power generating plant utilizing a Compressed Air Energy Storage system, the electric power generating plant being operated alternatingly in an energy storage mode and in a power generating mode, the method comprising:
    during the energy storage mode performing simultaneously the following operations:
    generating a supply of compressed air by driving an air compressor with a motor/generator which is operated as a motor;
    storing a first portion of the supply of compressed air generated in the air compressor in an air storage reservoir;
    generating a high pressure first supply of coal gas in a coal gasifier utilizing a remaining portion of the supply of compressed air generated in the air compressor; and
    storing the first supply of coal gas generated in the coal gasifier in a coal gas storage reservoir; and
    during the power generating mode performing simultaneously the following operations:
    generating a high pressure second supply of coal gas in the coal gasifier utilizing a first portion of the compressed air stored in the air storage reservoir;
    generating a gas stream by combusting a mixture of the first supply of coal gas generated in the coal gasifier, the second supply of coal gas stored in the coal gas storage reservoir, and a second portion of the compressed air stored in the air storage reservoir;
    operating a gas turbine with the gas stream; and
    generating a supply of electrical power by driving the motor/generator which is operated as a generator with the gas turbine.

* * * * *